United States Patent [19]
Colinet

[11] 3,911,756
[45] Oct. 14, 1975

[54] APPARATUS TO SUPPRESS NOISE IN GEARING

[75] Inventor: Rene D. Colinet, Philadelphia, Pa.

[73] Assignee: Industrial Research Laboratory Inc., Philadelphia, Pa.

[22] Filed: Jan. 9, 1974

[21] Appl. No.: 432,072

[52] U.S. Cl. .................. 74/410; 74/409; 74/467; 74/468
[51] Int. Cl.² .................. F16H 55/18; F16H 57/00; F16H 57/04
[58] Field of Search .............. 74/409, 410, 467, 468

[56] References Cited
UNITED STATES PATENTS

| | | | |
|---|---|---|---|
| 1,502,083 | 7/1924 | Zoelly | 74/468 |
| 2,659,240 | 11/1953 | Rubbra et al. | 74/410 |
| 3,238,730 | 3/1966 | Webb | 74/409 X |
| 3,424,022 | 1/1969 | Greenberg et al. | 74/410 X |
| 3,516,298 | 6/1970 | Arndt | 74/409 X |
| 3,777,588 | 12/1973 | Takahashi et al. | 74/467 X |
| 3,834,248 | 9/1974 | Caliri | 74/467 X |

*Primary Examiner*—Samuel Scott
*Assistant Examiner*—Lance W. Chandler

[57] ABSTRACT

A method to suppress noise in geared speed reductors, by inserting between cooperating teeth fields of repulsion forces increasing in intensity when the distance between teeth is reduced, thereby preventing metallic contacts between said teeth.

3 Claims, 4 Drawing Figures

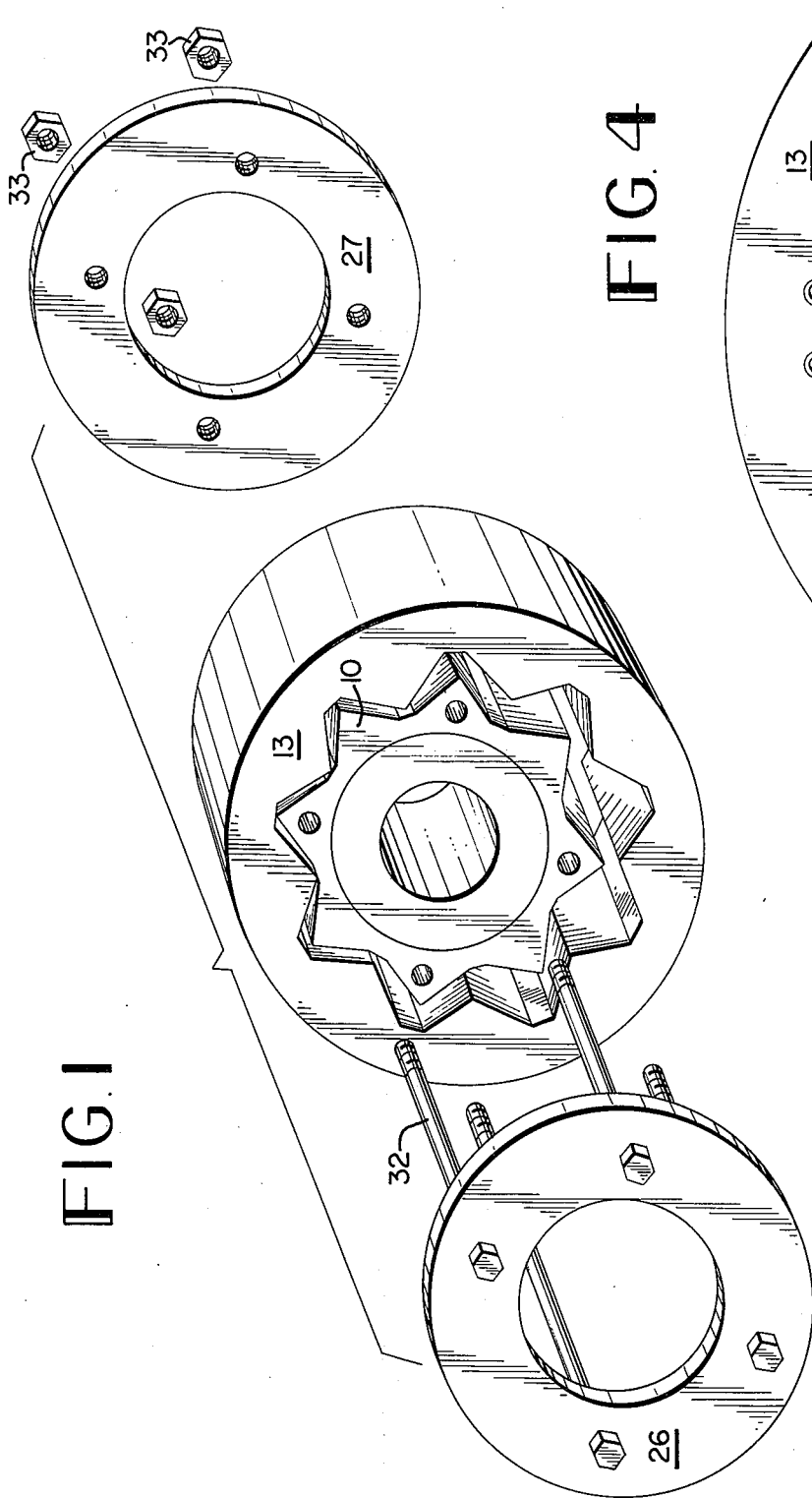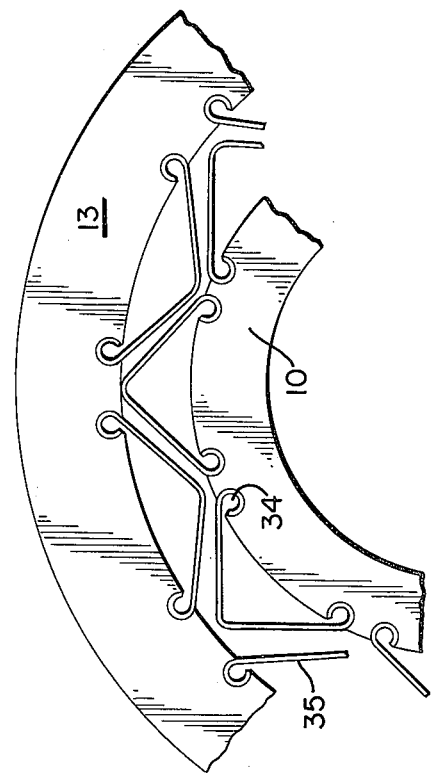

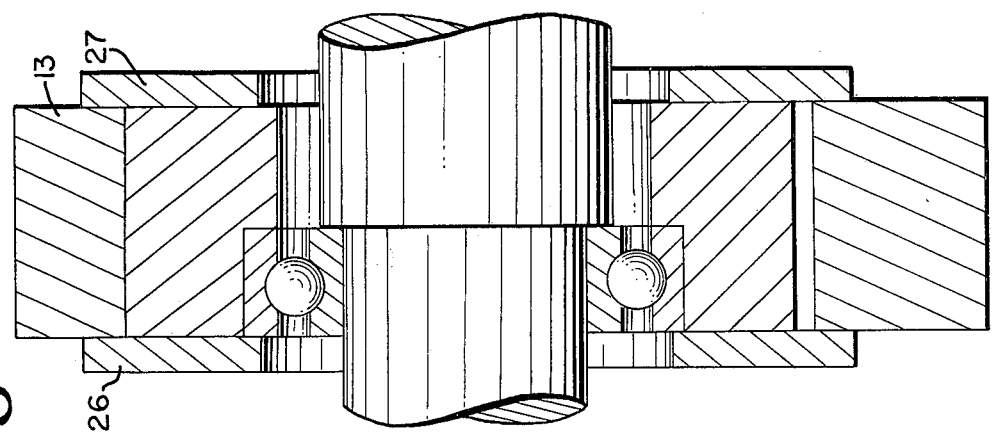
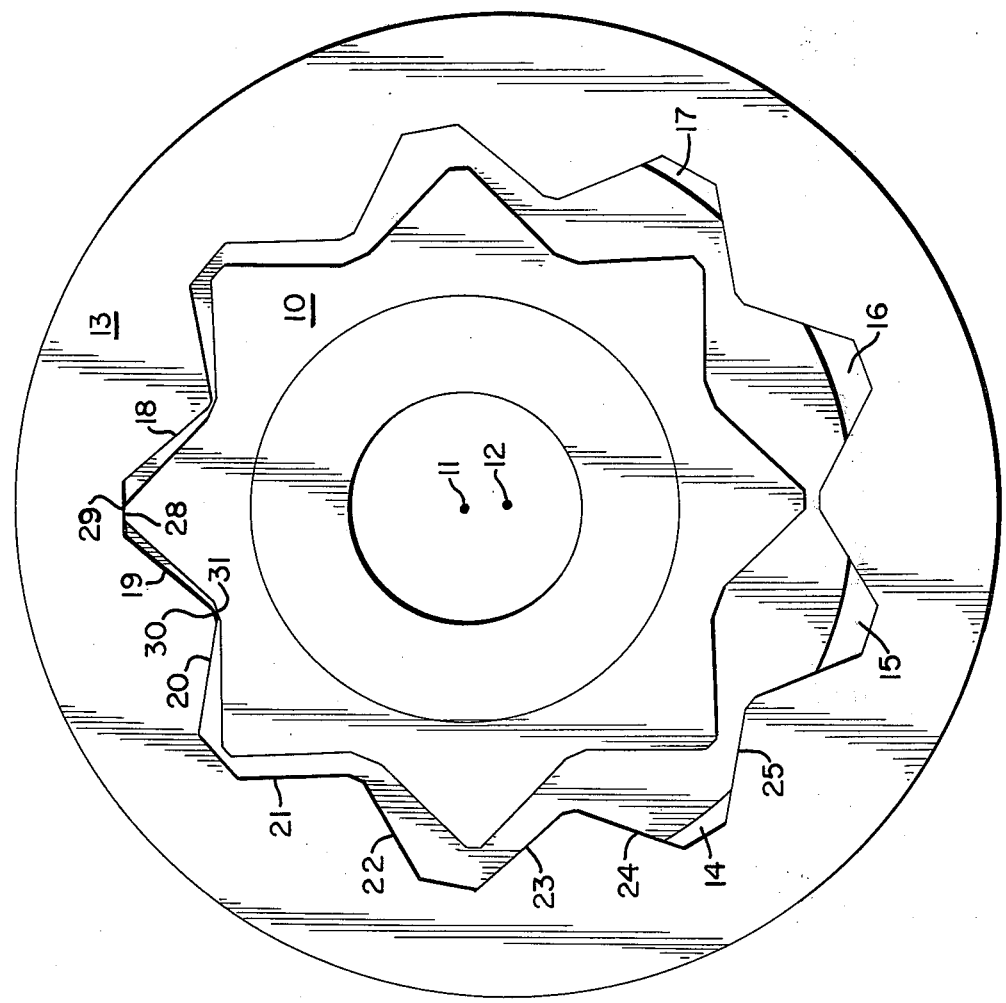

APPARATUS TO SUPPRESS NOISE IN GEARING

SUMMARY OF THE INVENTION

This invention is an Improvement to U.S. Pat. No. 3,783,712 to the applicant, covering a High Ratio Frictionless Speed Reductor, which uses planetary gears having dihedral teeth of a type free from friction losses, by inserting in the gap between said teeth free-spinning and free-shifting cylindrical rolls. The torque forces are transmitted from one tooth to the roll through linear tangential contact, then from the roll to the other tooth, also by tangential contact. There is no sliding friction, but only slipless rolling of a cylinder upon a plane.

It was found, however, that some noise is produced each time a roll comes into contact with a tooth. At that moment, the shock is similar to a hammer hitting an anvil. Since these shocks repeat themselves very fast as the meshing gears reach the deepest tooth penentration, a continuous sound results. Despite this, the reductor proved to be frictionless and was capable to transmit torque with no heat output even in the absence of any lubricant.

Analyzing the shock further, the applicant noticed a triple set of events happening for each tooth as the gears rotate:

1. In a first step, when the teeth come closer together with a loose roll between them, the shock occurs at the instant the roll gets pinched between the two teeth.

2. In a second step, the torque forces are transmitted without sliding friction, by pure rolling, but the roll could bounce several times after the initial shock.

3. In the third step, the teeth separate without shock, and the same events are repeated by the next coming tooth.

This situation made the applicant realize that the shock led to noise only because rigid materials are used for teeth and rolls. Resilient materials, such as nylon, rubber or even coiled steel springs compressed sideways were tried, but with little or no sound abatement, until the applicant conceived as ideal material a volume of contained air. Furthermore, the air cannot pass suddenly from a gap to a solid contact and if compression increases gradually between approaching teeth of air-trapping design (similar to piston and pump cylinder) the mounting pressure will soon equal the torque forces, stopping the teeth with a remaining air gap also free of noise. This air cushion then becomes the torque transmitter instead of the roll in the basic patent, with no noise at any time. The air prevented from leaking out from its containment is therefore a field of repulsion forces as mentioned in the Abstract.

The invention contains the field as illustrated in the specification, by properly designed volumes sealed by six cooperating walls free to slide against each other without leaking out.

In the illustrations:

FIG. 1 shows an exploded view in perspective of silent gears as per this invention, with the side walls pulled away to see the inside configuration of the teeth.

FIG. 2 is quite similar to FIGS. 1 and 2 of U.S. Pat. No. 3,783,712 in showing gears modified to add silence to lack of friction. The difference is in air tightness being added, when the active zone of deepest mutual penetration of both gears is reached.

FIG. 3 is a side view of the two gears, in vertical cross-section by the centers, showing the addition of external rings to stop air leakage by the ends of the teeth.

FIG. 4 shows one form of execution of gears of the invention to be used in speed reductors of the type described in the basic patent mentioned.

In all figures we assume that the inner gear 10 revolves around its center 11 clockwise when center 11 revolves itself as part of the input shaft, around fixed center 12 and center distance 11–12 remaining constant. The outer annular gear 13 is always stationary.

FIG. 1 shows the method of attachment of the side rings 26 and 27, using four bolts 32 through free holes in ring 26 and in the inner gear 10, but threading into ring 27. Said bolts are first adjusted to assure light but leak-proof contact of the rings 26 and 27 on the pair of gears 10 and 13. Then lock-nuts 33 are tightened to prevent any change in the said adjustment.

In FIG. 2 we discuss how plain atmospheric air surrounding all the teeth can be compressed by the rotation of the gears into high-pressure air cushions trapped between those teeth which transmit the torque in the zone of deepest mutual penetration of the meshing gears. No externally-compressed air is used in this design.

With the eccentric gear 10 rotating clockwise around its own center 11 while the said center 11 rotates counterclockwise around the stationary center 12, the teeth of the left side of the gear come closer to each other starting from the position shown in FIG. 2. The air between these teeth is compressed in the reducing gaps of teeth 20 to 25 with no escape at the top but with exhaust permitted at the bottom by clearances 14 and 15 over the rims of the seal rings 26 and 27 in the cavity of the tooth 25. Since the rotation is very fast, the air is compressed in the cavity 20 which is about to be closed like cavity 18 is shown. Also cavity 21 is about to be further reduced such as cavity 19 is shown. We consider now the cavities 18 and 19 in the fast running condition where the inner gear 10 resists rotation by the output torque, tending to bring contact between the teeth 19 and 28. But this is opposed by the compressed and enclosed volume of air in the left gap of teeth 19 and 28. As these teeth try to get closer, the air pressure increased by compression and before the air can leak out through seal imperfections, that pair of working teeth has moved away to be succeeded similarly by the next pair.

The air pumping action just described is peculiar as being intermediary between the static action of perfectly sealed piston-in-cylinder low speed pumps, and the dynamic action of unsealed centrifugal pumps running at high speed. A short analysis shows how the pumping of the invention operates:

Let us assume the input shaft of the reductor rotating at 1750 RPM or 29.16 RPS. During one revolution of the inner gear 10, eight teeth have passed in eight successions of the closed position shown in 28 of FIG. 2. The compression cycle therefore lasts $1/29.16 \times 8 = 0.004286$ second only Let us also assume the seals were poorly machined to the extent that the leaks are equivalent to a hole ⅛ inch square or 1/64 sq. inch and again assuming the air leaking out through that hole at the linear speed of 120 inch/second.

The the volume of air lost during one compression cycle would be 0.004286 (time in fraction of one second) × 120 (distance in inches of motion in one second) × 1/64 (area of hole in square inches) = 0.004286 (time) × 1.87 (in³ per second) = 0.0080 (volume in in³).

This is the volume of a cube measuring 0.2 inch or about 3/16 inch on its sides. This loss would be hardly enough to show an appreciable drop of pressure between the teeth in that very short time.

In case of very large torque forces and low rotation speeds of the input shaft, we could replace air by a compressible liquid of much greater viscosity to keep the leakage very low. Such liquids exist: Kent's Mechanical Engineer's Handbook, 12th edition page 13-05 mentions ordinary hydraulic mineral oils as having compressibility with a modulus of elasticity of 200,000 psi. Even water has 300,000 psi modulus of elasticity. Should this be still too rigid, it would be simple enough to increase leakage by even poorer machining.

On the right side of the each gear, we have vacuum instead of compression of air between the teeth because the torque transmitted by the reductor pushes the inner gear 10 counterclockwise, thereby enlaring the sealed volume 28–18 (FIG. 2) and reducing the air pressure in it. The inlet 16 of FIG. 2 will then permit outer air to enter the gears to block too much exhaust from the left side to act unfavorably.

Constructively speaking, the air-tight volumes are obtained by extending the apices of the external teeth such as 28 in FIG. 2 until they touch in the region of deepest mutual penetration of the gears the cylindrical cavities such as 29 of the annular gear 13. Said cavities are substantially wider than the narrow tip 28 to permit the inner gear to move slightly right and left of their central position shown, even though the centers 11 and 12 and gear 13 are stationary. This clearance is intended to permit air to reach higher pressure until the torque force is balanced.

Similarly, the apices of the internal teeth such as 30 of the outer gear are extended radially toward center until they touch the cylindrical bottom 31 of the inner gear 10. The small angular motion of gear 10 with the centers 11 and 12 stationary is similar to the motion of a piston in a tight cylinder, to increase air pressure when tooth 28 moves toward the left.

Gears such as 10 and 13 can be profiled out of cylindrical metallic blanks by several machining methods, such as:

1. For the inner gear
   a. band sawing the tooth faces to correct depth to reach the circle of cavity bottoms. There is no need for great accuracy in this sawing but it should be obtained for the cylindrical cavity bottom, first by milling or shaping metal away in the rough, between two adjacent teeth, and then by grind-finishing across the blank with slow angular feed of the blank around its axis.
   b. Deburring all edges.
2. Outer annular gear
   a. Bore the blank to the diameter of the teeth tops such as 30.
   b. With a cut rewelded band saw in this bore, cut all tooth faces at correct depth to reach the circle of cavity bottoms.
   c. Mill or shape most of the excess metal, and finish the cylindrical surfaces with internal grinding such as for the inner gear.

The above method is recommended for a prototype or small production series. For large production, a cheaper method would consist in punching laminations in sheet metal and packing them to the desired thickness, securing them with bolts, screws, rivets or welds. For small reductors, precision pressure casting requiring no further machining would be recommended for mass production economy.

Another fast method of machining a prototype or a small number of units is shown in FIG. 4. Multiple holes in circular configuration and conveniently spaced, would be drilled in the annular blank before it is bored. Afterwards, the bore would open a slot in every hole. Into the holes, individual teeth made of blue hard steel strapping ribbon of the proper width and thickness, rolled at the ends into roll-pin shape, and bent in the center with a substantial radius, are press-inserted. The void inside each tooth might be filled with any inert material to prevent air leakage between ribbon and the wheel. The holes 34 in the blank should be slightly smaller than the rolled ends of the teeth 35, with beveling the edges of the roll-pins as customary for easy entrance prior to pressing into full penetration flush with the face of the blank. For the inner gear the blank must be oversized to permit drilling in full metal before slotting the holes as explained above.

Having thus described my invention, what I claim as new and desire to secure by Letter Patent is:

1. In a pair of meshing gears consisting in one first inner gear having an axis of rotation and having dihedral external teeth, located inside a second outer gear having another distinct axis of rotation parallel to the axis of rotation of the first inner gear and having dihedral internal teeth, the introduction in the gaps between meshing teeth of a field of repulsion forces provided by a compressible fluid entrapped in the zone of deepest mutual penetration of meshing teeth, said zone being defined by sliding contacts between tips and cavities of mating teeth, and by external flat rings closing the ends of all teeth in the said zone, with each zone enclosing a variable volume when the tips are allowed to slide against the cavities, the latter being profiled as cylindrical surfaces touching the tips and centered on the opposite gear, said field of repulsion forces increasing in intensity of fluid compression when the tips approach the next cavity dihedral faces causing the volume of the zone to be reduced and said fluid transferring the torque from one gear to the other without metallic contact between adjacent teeth dihedral faces.

2. Gear arrangement as in claim 1, where the compressible fluid is atmospheric air being renewed at each revolution by an intake and expelled by an exhaust, both opposite to the said zone with respect to the gear centers.

3. Gear arrangement as in claim 1, where the external flat rings closing the ends of the teeth also function to unmask intake and exhaust orifices which are cavities between the teeth of both gears in a region of no-meshing diametrally opposed to the said zone of deepest mutual penetration of the meshing gears.

* * * * *